G. E. FRAZER.
VALVE FOR INTERNAL COMBUSTION ENGINES.
APPLICATION FILED JULY 6, 1914.
1,139,661.
Patented May 18, 1915.
2 SHEETS—SHEET 2.
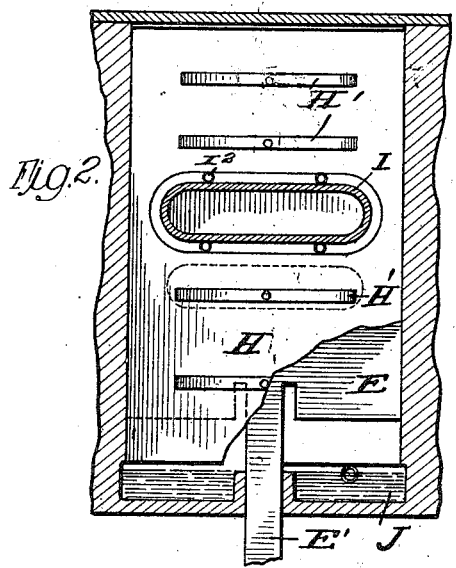
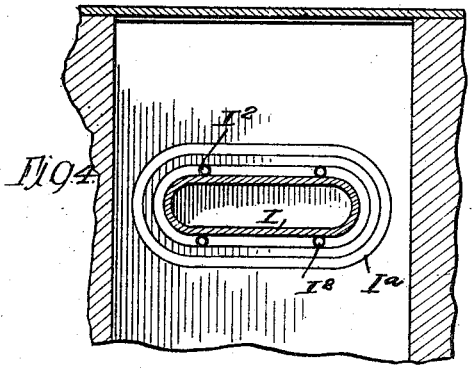
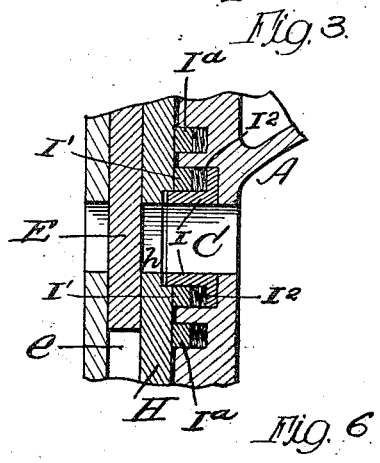
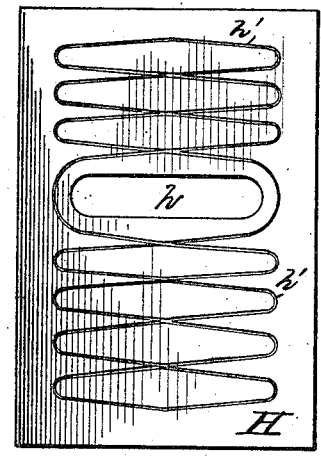
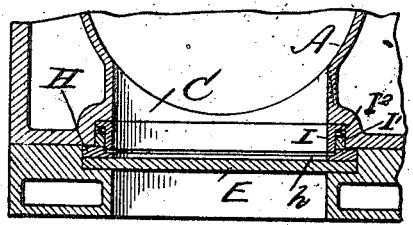
Witnesses
E. R. Barrett
Lena Weigand
Inventor
George E. Frazer
By J. E. Thomas
Attorney

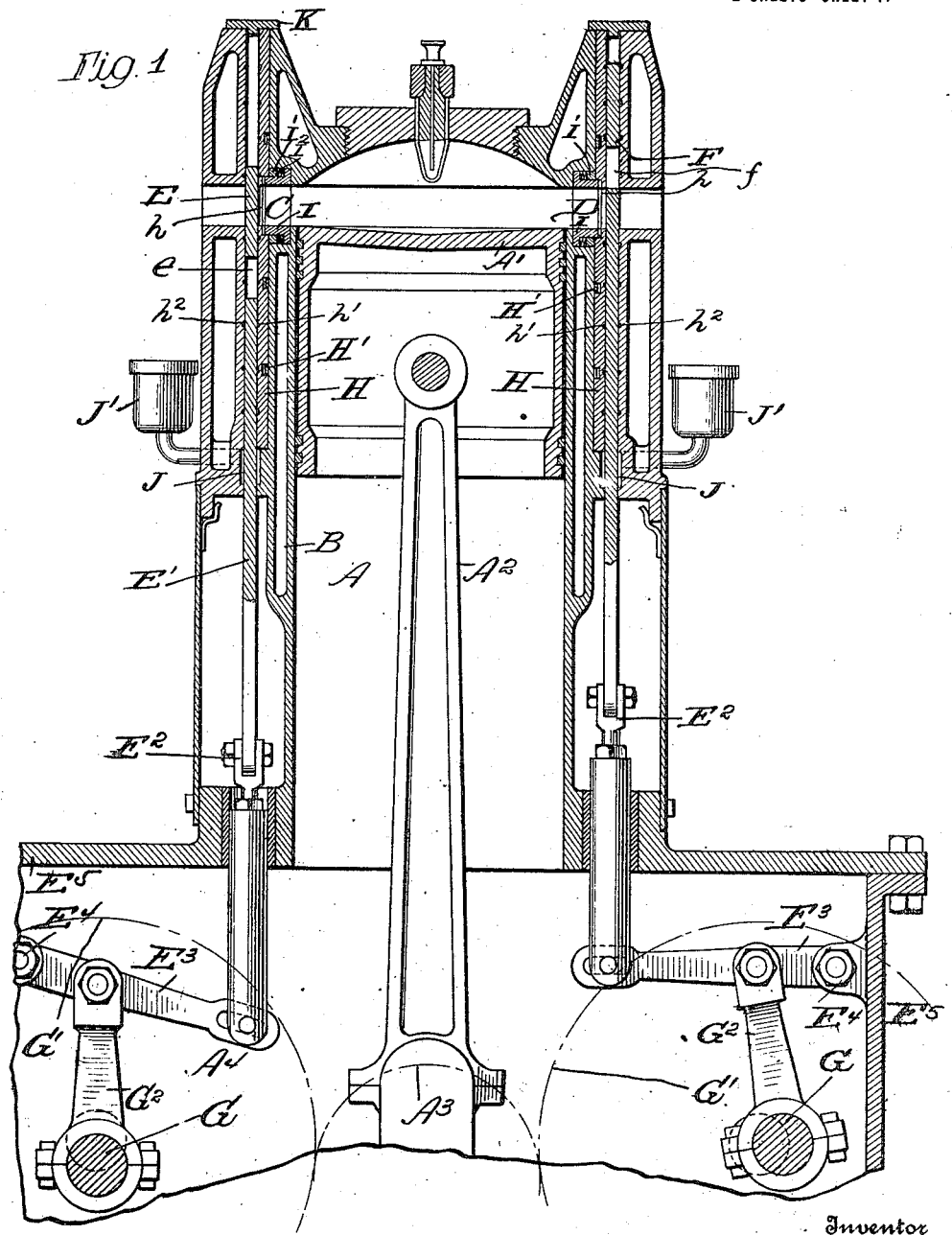

UNITED STATES PATENT OFFICE.

GEORGE E. FRAZER, OF FLINT, MICHIGAN.

VALVE FOR INTERNAL-COMBUSTION ENGINES.

1,139,661.  Specification of Letters Patent.  Patented May 18, 1915.

Application filed July 6, 1914. Serial No. 849,038.

*To all whom it may concern:*

Be it known that I, GEORGE E. FRAZER, citizen of the United States, residing at Flint, county of Genesee, State of Michigan, have invented a certain new and useful Improvement in Valves for Internal-Combustion Engines, and declare the following to be a full, clear, and exact description of the same, such as will enable others skilled in the art to which it pertains to make and use the same, reference being had to the accompanying drawings, which form a part of this specification.

My invention relates to an improvement in valves for internal combustion engines shown in the accompanying drawings and more particularly pointed out in the following specification and claims.

The object of the present invention is to overcome well known objections to the puppet type of valve in common use such as noisy operation, frequent grinding, and the removal of carbon to insure proper seating, by constructing a valve of sliding type adapted to automatically take up any wear occasioned through use between the valve and its co-acting elements, and also to insure a tight joint between registering parts, thereby providing against loss of compression.

Other advantages and improvements will hereafter appear.

In the drawings accompanying this specification:—Figure 1, is a vertical cross sectional view through the cylinder and a portion of the crank case of an internal combustion engine, showing the inlet and exhaust valves. Fig. 2, is a fragmentary sectional view through the valve chamber, showing a portion of the adjustable valve plate, the valve back of it, and the ring surrounding the port provided in the adjustable valve plate. Fig. 3, is a fragmentary sectional view of the cylinder and valve chamber, showing a plurality of rings surrounding the port. Fig. 4, is a fragmentary sectional view of the valve chamber at right angles to Fig. 3 showing the rings surrounding the port in elevation and section. Fig. 5, is an elevation of the adjustable plate opposing the valve, indicating the oil grooves formed therein to distribute a lubricant. Fig. 6, is a horizontal sectional view of a fragmentary portion of the cylinder in line with one of its ports and also through the valve and valve chamber.

Referring now to the letters of reference placed upon the drawings, A denotes the cylinder of an internal combustion engine, $A'$ its piston, $A^2$ the piston rod or crank, $A^3$ the main crank shaft, and $A^4$ a gear, for actuating the inlet and exhaust valves carried by the main crank shaft, B is the water jacket surrounding the cylinder, C the inlet, and D the exhaust ports.

E indicates the inlet valve provided with a port $e$, and F the exhaust valve with a like port $f$:—the inlet and exhaust valves being identical in construction and operation a description of one will include the other. The valve E is provided with a stem $E'$ projecting through the lower wall of the valve chamber and at its end is connected by a bifurcated plunger rod $E^2$,—sleeved in the frame—with a rocking lever $E^3$, pivoted at $E^4$ to the wall of the crank case $E^5$.

G is a crank shaft, carrying a pinion $G'$ in mesh with the gear $A^4$ on the main crank shaft $A^3$.

$G^2$ is an arm connecting the rocking lever $E^3$ with the crank shaft G.

H, is an adjustable plate forced into contact with the valve by springs $H'$, and having an opening $h$ registering with the port $C'$ leading into the cylinder.

I, is a flanged ring,—hereafter termed a retaining ring, partially lodged in a recess formed in the cylinder wall surrounding the port C, having a projecting edge which enters a recess in the adjustable plate H surrounding the opening $h$.

$I'$, is a compression ring between which and the retaining ring I, are located a plurality of springs $I^2$ to force the rings respectively into contact with the face of the plate H and the wall of the cylinder.

In the modification shown in Figs. 3 and 4 an additional compression ring $I^a$ is provided to more fully insure a tight joint around the port openings if required. The face of the adjustable plate H,—see Fig. 5—is provided with grooves $h'$ designed to distribute lubricating oil over the valve as it reciprocates in contact therewith,—the opposite face of the valve being lubricated by oil distributed by similar grooves $h^2$ in the contacting face of the valve chamber—see Fig. 1.

J is an oil pocket in the lower end of the valve chamber, and in the embodiment shown is fed by an oil cup $J'$ connected therewith, it is obvious however, that it may be fed by a force feed oil system. The valve as it reciprocates dips into the pocket J, carrying oil up with it into the grooves h' and h² which distribute the oil over the face of the valve and adjacent contacting surfaces.

K is a removable cover plate secured to the wall of the cylinder by removing which the valve may be withdrawn or replaced.

Having indicated the several parts by reference letters—the construction and operation of the device will be readily understood. The inlet and exhaust valves in the present embodiment are actuated by suitable mechanism in turn operated by the crank shaft actuated by the piston. The exhaust valve is timed to close when the inlet valve is opened to deliver gas to the cylinder, and upon firing the charge both valves are closed, followed immediately by the opening of the exhaust valve to release the burned gases—after which the exhaust valve again closes and the cycle of operation is repeated. The valve as constructed is adapted to open and close the port twice every revolution of shaft G; therefore, the upper half of the valve takes the explosion while the portion of the valve below the opening is cooling and vice versa, thus the motion and consequent wear is greatly reduced and the valve kept bright and free from carbon. The compression ring I' and the coacting retaining ring I is forced apart and in contact respectively with the adjustable valve plate and the wall of the cylinder through the action of the interposed springs I², to insure a tight joint around the port opening, the joint between the adjustable valve plate and the wall of the cylinder being further protected by the projecting rim of the retaining ring which enters the recess formed in the valve plate.

It will be obvious that any wear between the valve and its abutting wall (which would otherwise result in loss of compression) is taken up by the adjustable valve plate H, acting in conjunction with one or more yieldable baffle rings I', surrounding the port leading into the cylinder; and that the valve being designed to slide rather than to lift is kept free from carbon deposit and is practically noiseless in action. It will also be obvious that any suitable means may be employed to actuate the valve without departing from the spirit of my invention. So also if desired a projecting rim integral with the cylinder may be provided to surround the inlet and exhaust ports, in place of the projecting rim of the retaining ring I, that the joint may be broken between the wall of the cylinder and the adjustable plate H.

Having thus described my invention what I claim is:—

1. In an internal combustion engine, a sliding valve, means for actuating the valve, an adjustable plate adapted to bear against the valve having an opening registering with the gas port leading to the cylinder, resilient elements to force said plate into contact with the valve, means surrounding the opening in the adjustable plate and co-acting means surrounding the gas port connected with the cylinder respectively adapted to overlap, whereby the joints between the abutting plates and the cylinder wall are broken.

2. In an internal combustion engine, a sliding valve, means for actuating the valve, an adjustable plate adapted to bear against the valve having an opening registering with the gas port leading to the cylinder, resilient elements to force said plate into contact with the valve, rings surrounding its gas ports carried by the wall of the cylinder adapted to overlap the edge of the adjustable plate, co-acting rings located between the plate and the wall of the cylinder adapted to encircle said first named rings, and means for forcing said rings apart and in abutting contact with the adjustable plate and cylinder wall.

3. In an internal combustion engine, a reciprocating valve provided with a port designed to register with the gas port leading to the cylinder, said valve being adapted to close said cylinder port when said valve port is either above or below the gas port in the cylinder, means for actuating the valve, an adjustable plate adapted to bear against the valve having an opening registering with the gas port, means adapted to break joints between the adjustable plate and the abutting face of the cylinder wall surrounding the ports, and resilient elements to force said plate into contact with the valve.

4. In an internal combustion engine, a sliding valve, means for actuating the valve, an adjustable plate adapted to bear against one face of the valve having an opening registering with the gas port leading to the cylinder and provided also with an annular recess surrounding the opening, resilient elements to force said plate into contact with the valve, means carried by the wall of the cylinder adapted to project into the recess formed in the adjustable plate, an annular ring adapted to encircle the opening in the plate located between the plate and the wall of the cylinder, and means for forcing said ring into abutting contact with the adjustable plate.

5. In an internal combustion engine, a sliding valve, means for actuating the valve, an adjustable plate adapted to bear against one face of the valve having an opening registering with the gas port communicating with the cylinder and provided also with an annular recess surrounding the opening, resilient elements to force the plate into contact with the valve, a flanged ring partially lodged in the wall of the cylinder surrounding the gas port, its projecting flange extending into the recess in the adjustable plate, whereby the joint between the wall of the cylinder and the face of the plate may be broken, a ring concentric with the flange ring adapted to bear against the face of the adjustable valve plate, and suitable resilient elements between said rings to force them apart and in respective contact with the adjustable plate and the wall of the cylinder.

6. In an internal combustion engine, a valve chamber having an oil pocket into which the valve is adapted to dip as it reciprocates, and an adjustable spring actuated plate adapted to bear against the valve having an opening registering with the gas port leading to the cylinder and with grooves to distribute the oil from the oil pocket over the face of the valve, the wall of the valve chamber opposing the valve having like oil distributing grooves, whereby the faces of the valve may be lubricated upon the valve being reciprocated.

In testimony whereof, I sign this specification in the presence of two witnesses.

GEORGE E. FRAZER.

Witnesses:
　GYLES E. MERRILL,
　CORA D. SHEPNER.